United States Patent [19]

Downer et al.

[11] 3,951,930

[45] Apr. 20, 1976

[54] EXTRUSION POWDER

[75] Inventors: John Michael Downer, Harpenden; Colin Greig Kinnear, Welwyn Garden City, both of England

[73] Assignee: Imperial Chemical Industries Limited, London, England

[22] Filed: Sept. 17, 1974

[21] Appl. No.: 506,780

Related U.S. Application Data

[63] Continuation of Ser. No. 276,167, July 28, 1972, abandoned.

[30] Foreign Application Priority Data

Aug. 12, 1971 United Kingdom............... 37874/71

[52] U.S. Cl.................................... 526/82; 526/86; 526/229; 526/250; 428/379
[51] Int. Cl.².......................... C08F 2/16; C08F 4/38; C08F 14/26
[58] Field of Search................. 260/87.5 A, 92.1 R; 450/638, 709

[56] References Cited
UNITED STATES PATENTS
3,142,665  7/1964  Cardinal et al. ................... 260/92.1

FOREIGN PATENTS OR APPLICATIONS
6,411,656  6/1965  Netherlands................ 260/87.5 UX

*Primary Examiner*—Stanford M. Levin
*Attorney, Agent, or Firm*—Cushman, Darby & Cushman

[57] ABSTRACT

A tetrafluoroethylene polymer or copolymer suitable e.g. for extrusion on to wire to give an insulated conductor is produced using a dual catalyst system. The first catalyst component is a catalyst giving a high molecular weight (low SSG) such as ammonium persulphate (APS). The second component is a dibasic acid peroxide e.g. disuccinic acid peroxide (DSAP) which is added after the polymerisation has reached 20% conversion. The latter catalyst is found to produce a copolymer powder which can be extruded on to wire to give faultfree coating.

6 Claims, No Drawings

EXTRUSION POWDER

This is a continuation of application Ser. No. 276,167 filed July 28, 1972, now abandoned.

This invention relates to tetrafluoroethylene polymer extrusion powders and methods of making them.

Polytetrafluoroethylene extrusion powders prepared by coagulating aqueous colloidal dispersions of polytetrafluoroethylene are useful in the manufacture of thin walled articles such as wire coatings, tubing and the like. For ease of extrusion during manufacture and optimum performance in service it is advantageous that the extrusion powder shall have as a preferred combination of properties, a low extrusion pressure, the ability to give a coherent coating on extrusion at high reduction ratio and a high molecular weight.

Polytetrafluoroethylene may be extruded as rod, tube or as a coating on wire by an extrusion process in which a mixture of the polymer and a lubricant, such as a liquid hydrocarbon, is forced under pressure at temperatures of about 30°C through a die, the lubricant being subsequently removed by drying prior to sintering the polytetrafluoroethylene to eliminate the voids left by the lubricant. In order that the powder may be extruded into long lengths of wire coating, or tubing of small dimensions, using the commercially available equipment it is necessary that the polymer is capable of being extruded at high reduction ratio the reduction ratio being the ratio of the cross-section of the barrel of the extruder to the cross-section of the extrudate emerging from the die. Thus it is required that the extrusion pressure of the polymer, measured as hereinafter described, should be low, in order that the pressure developed in the machine under these conditions of high reduction ratio is not greater than the maximum capacity of the machine. It is preferred that the extrusion pressure of the powder as measured under the test conditions hereinafter described should not exceed 12000 p.s.i. (82.7 MN/m$^2$) although for articles of greater cross-section extruded at lower reduction ratios this figure may be exceeded.

It is a further requirement that, since a major outlet for the extruded products is for electrical insulations, the sintered extrudates shall be as far as possible free from pinholes, cracks and other defects prejudicial to the insulation afforded by a coherent coating of PTFE.

A still further requirement is that the polymer shall exhibit good heat ageing, that is the ability to retain good insulation properties on the coated wire even after subjection to high temperatures for long periods of time, for example several days at 315°C. It has been found that the higher the molecular weight of the polymer as indicated by measurement of its standard specific gravity, the better is the performance in this respect.

High molecular weight polymers are readily produced using a free radical catalyst selected from hydrogen peroxide and salts of water soluble persulphates but the resulting products are frequently prone to give a very poor performance during extrusion at high reduction ratios resulting in flawed products.

Dutch patent application No. 64 11656 describes the use of a two component catalyst system for producing a copolymer of tetrafluoroethylene in which a more active catalyst, for example ammonium persulphate, is used in combination with a less active catalyst, for example disuccinic acid peroxide. The claims of the application require that the less active of the two catalysts is present at least before the solids content of the reaction mixture reaches 7% by weight. There is however no disclosure in the application of the addition of the less active catalyst after the commencement of the reaction. It has now been found that improved products, particularly in respect of their ability to be extruded into fault-free products at a high reduction ratio, are obtained when a dibasic carboxylic acid peroxide is added after 20% by weight but before 85% by weight of the polymer to be formed has been polymerised.

According to this invention there is provided a process for the production of polymers of tetrafluoroethylene suitable for extrusion at a high reduction ratio wherein tetrafluoroethylene is homopolymerised or is polymerised in the presence of a chain transfer agent or is copolymerised with a minor amount of one or more comonomers in an aqueous medium in the presence of a free radical catalyst system and a dispersing agent to produce an aqueous dispersion of the tetrafluoroethylene polymer characterised in that the polymerisation is initiated by the use of a catalyst selected from water soluble persulphates and hydrogen peroxide and after 20% by weight (preferably after 25% by weight) but before 85% by weight of the total polymer to be formed has been polymerised, a dibasic carboxylic acid peroxide is added. This addition is usually made after the solids content of the dispersion has reached 7% by weight in contrast with the claims of the above mentioned Dutch patent application No. 64 11656.

A preferred dibasic acid peroxide is disuccinic acid peroxide. Diglutaric acid peroxide may also be used. When disuccinic acid peroxide is used the amount added should be sufficient to provide a concentration of at least 0.005%, preferably 0.01 to 0.06% by weight on the weight of the aqueous medium.

It has been found that by use of the foregoing process, a tetrafluoroethylene copolymer may be produced which exhibits improved extrusion performance when compared with the high molecular weight polymers previously referred to produced using a free radical catalyst selected from hydrogen peroxide and salts of water soluble persulphates and compared with polymers produced when the dibasic carboxylic acid is added before 20% or after 85% by weight of the total polymer to be formed has been polymerised. This is illustrated by the examples in this specification.

The tetrafluoroethylene polymer powders made by the process of this invention may be prepared, with the inclusion of the above defined process steps, using the conventional techniques known for polymerising tetrafluoroethylene and described, for example, in United Kingdom patent specification No. 689 400.

Preferably from 0.1 to 0.2% by weight of emulsifier based on the weight of the aqueous polymerisation medium is used in the practice of the present invention.

The tetrafluoroethylene may be homopolymerised, preferably in the presence of a chain transfer agent, or may be copolymerised in the presence of a minor amount of a copolymerisable monomer e.g. perfluoroalkyl trifluoroethylenes, for example hexafluoropropene.

A preferred copolymer in accordance with the invention may be made by use of hexafluoropropene as comonomer advantageously included in the monomer charge at a concentration sufficient to give a polymer containing up to 0.3% of copolymerised hexafluoropropene. The hexafluoropropene used should be substantially free from impurities such as perfluorobutyne-2 and perfluorobutene-2. Pure hexafluoropropene may be obtained by the method of purification disclosed in U.S. Pat. No. 3,022,357. Optimum results, with respect to the extrusion performance of the polymers and the subsequent ability of extruded articles to withstand extreme temperature conditions, are obtained when the mixture of tetrafluoroethylene and hexafluoropropene used for the preparation of the polymers contains less than a total of 0.001% by weight (based on the total weight of fluorocarbon monomers) of impurities such as perfluorobutyne-2 and perfluorobutene-2.

The molecular weight of the polymers produced is difficult to determine accurately. A rough measure of the number average molecular weight of the polymers produced in this invention may be obtained by measuring the standard specific gravity (SSG) of the polymers by the method of ASTM D1457-56. Copolymers of high SSG are found to have poorer heat ageing after extrusion to form wire coatings and sintering than copolymers of smaller SSG which have a larger number average molecular weight.

The ease of extrusion may be assessed by measuring the pressure required to extrude the polymer under the set of standard conditions detailed below. The powder is mixed with 16% by weight of "Isopar" H (Humble Oil and Refining Company). After rolling for 30 minutes in a bottle, the mixture is conditioned at 25°C for at least 4 hours. The lubricated mixture is then poured into a mould and is formed into a preform by increasing the pressure up to 2.0 MN/m$^2$ over a period of 5 minutes. The pressure is then maintained at 2.0 MN/m$^2$ for a further 5 minutes. The preform is then extruded at 30°C using a hydraulic operated extruder having a constant ram speed of 2.0 cm per minute. The polymer is extruded through a die having a land diameter of 1.27 mm and a land length of 6.35 mm and an included angle of 20°C. The reduction ratio, that is the ratio of the cross-sectional area of the barrel of the ram to the cross-sectional area of the die is approximately 900:1. The pressure required to extrude the polymer under these conditions is measured by means of a pressure transducer.

The quality of the extrusion may be assessed by using the polymer to coat wire under practical running conditions using a Davis Electric Co. PTFE ram extruder. The polymer sample is mixed with 18% by weight of petroleum ether (100–120°C fraction). After 30 minutes rolling in a jar to ensure thorough mixing the powder is stored at 25°C for at least 4 hours. Immediately prior to preforming the composition is re-rolled for 5 minutes. The lubricated composition is then preformed in a 3.81 cm diameter cylinder containing a mandrel so that the preform produced has a cylindrical hole along the longitudinal axis of the preform in order that it may be conveniently placed over the guide tip in the wire coating machine. The preform is extruded on a Davis Electric Co. PTFE ram extruder with a 3.81 cm diameter extrusion cylinder fitted with a die of the following dimensions:

| | |
|---|---|
| Die land diameter | 1.09 mm |
| Die land length | 6.35 mm |
| Included angle of die | 20° |

The wire used is 7/0076 stranded copper having an overall diameter of 0.58 mm. The reduction ratio can be calculated to be 1650:1. The wire is guided through the die by means of a guide tube of internal diameter 0.61 mm and outside diameter 1.02 mm. The guide tube tip clearance is 0.76 mm. The die temperature is maintained at 70°C and the ram is driven at a linear speed of 1.65 cm/min. The coated wire passes through two ovens, the first held at 250°C to remove the lubricant, the second at 500°C to sinter the polymer. The speed of the wire passing through the tip is adjusted to give a coated wire of about 0.97 mm in diameter. The number of defects occurring in the wire are measured by passing the wire through a high voltage electrode spark tester at a voltage of 2.5 kV. The conditions are then increased in severity by increasing the take-off speed of the wire in steps of 1.52 meter/min so that the speed of the wire exceeds the rate of polymer extruding from the die. Under these conditions the polymer coating can be drawn down to decreasingly smaller diameter. Polymers which can be drawn down to give a coated wire of diameter 0.93 mm with less than five faults per 30 meters of coated conductor, under these conditions, are deemed to be satisfactory although it is obviously preferable that either the frequency of electrical faults should be lower at this coating diameter or that even thinner coated wires be obtained with this maximum level of electrical faulting.

The products of the invention may be used in the fabrication by the known paste extrusion techniques into wire coatings, tubes, rods tapes or films. The extruded products may be sintered to give articles which have outstanding electrical insulation properties and in addition have a low coefficient of friction, outstanding resistance to chemicals, thermal degradation and mechanical stress.

The invention is illustrated by the following examples, examples 1, 2, 10 and 11 being for comparison purposes. Percentages unless otherwise stated are by weight.

EXAMPLE 1

Into a 10 liter, stirred, horizontal autoclave were charged 5900 ml of distilled water, 60 g of paraffin wax and 9 g of ammonium perfluoro octanoate. The autoclave was heated to 70°C and then evacuated for five minutes to remove oxygen dissolved in the water. A vacuum of about 50 cm of mercury was obtained. The vacuum was then reduced by exactly 24 cm of mercury by admitting hexafluoropropene. The autoclave was then pressurised to 2.1 MN/m$^2$ (300 psig) with tetrafluoroethylene. A solution of ammonium persulphate (0.12 g in 100 ml water) was injected into the autoclave. A reaction ensued and the pressure in the autoclave fell. After the pressure had fallen to a value of 1.8 MN/m$^2$ (260 psig) the autoclave was repressurised to 2.1 MN/m$^2$ (300 psig). The repressurisation procedure was repeated 60 times. At the end of the last pressure drop the gas phase in the autoclave was slowly vented to atmosphere until the pressure in the autoclave was at atmospheric pressure. The reaction time was 174 minutes and the solids content of the dispersion was 36.0%. The dispersion was coagulated by mechanical agitation after dilution with water to a solids content of 10%. The resulting fine powder was dried to give a moisture content of less than 0.05%. The combined HFP content was determined from the infra-red absorbence of the powder when coldpressed into a sample about 0.06 cm thick. The ratio of the absorbence at a wavelength of 10.18 $\mu$m to the absorbence at a wavelength of 10.7 $\mu$m is multiplied by 3 to give the combined HFP content as a weight percent value. A value of 0.10 weight % was obtained for the product of this example.

The extrusion pressure of the powder determined by the method previously described was 87.0 MN/m² (12500 psi). The SSG of the powder determined by the method of ASTM D1457-56 was 2.173. The extrusion quality was assessed using the wire coating test previously described. It was not found possible to produce a satisfactory coating. With the machine conditions set to give a coated wire diameter of 0.97 mm the spark tester recorded faults continuously.

EXAMPLE 2

The procedure of Example 1 was repeated except in that after the repressurisation procedure had been carried out seven times (equivalent to an estimated solids content of dispersion of 7.3% and a monomer conversion of 17%) 1.8 g of disuccinic acid peroxide (DSAP) dissolved in 100 ml distilled water was injected to give a DSAP concentration in the aqueous polymerisation medium of 0.03% by weight. By monomer conversion we mean the amount of polymer formed at the stage in question expressed as a percentage of the total weight of polymer which is to be formed in the polymerisation as a whole. After a total of 60 pressurisations a dispersion with a solids content of 32.2% was obtained. The reaction time was 83 minutes. The combined hexafluoropropene content of the fine powder was found to be 0.10% and the SSG was 2.208. An extrusion pressure of 80 MN/m² (11500 psi) was obtained by the first test mentioned above. The extrusion performance as assessed by the wire coating test was very poor, continuous faults being recorded when the machine was set to give a coated wire diameter of 0.97 mm.

EXAMPLE 3

The procedure of Example 2 was repeated except in that the addition of disuccinic acid peroxide was made after 25 repressurisations had been carried out (equivalent to an estimated solids content of 21% and a monomer conversion of 44%). After a total of 60 repressurisations a dispersion with a solids content of 37.6% was obtained. The reaction time for the polymerisation was 148 minutes. The combined hexafluoropropene content of the fine powder was 0.11% and the powder had an SSG of 2.187. The extrusion pressure of the powder was found to be 70 MN/m² (10000 psi). The extrusion performance was found to be excellent. When the machine conditions were set to give a coated wire diameter of 0.94 mm only one fault was detected in 30 meters of coated wire. The diameter of the coating was progressively reduced by increasing the take-off speed of the wire until the coated wire diameter had been reduced to 0.89 mm. No faults were detected in a 30 meter length of wire coated under these conditions.

EXAMPLE 4

The procedure of Example 2 was repeated except in that the disuccinic acid peroxide was added after 38 pressurisation steps (equivalent to an estimated solids content of 30% and a monomer conversion of 72%). After a total of 60 pressurisations a dispersion with a solids content of 37.3% was obtained. The reaction time for the polymerisation was 169 minutes. A fine powder with a combined HFP content of 0.10% and an SSG of 2.176 was obtained. The extrusion pressure of the powder was 59 MN/m² (8400 psi). The extrusion performance as assessed by the wire coating test was rated as excellent. With the machine adjusted to give wire with a coated diameter of 0.94 mm, three faults were detected in a 30 meter length of coated wire. When the wire take-off speed was increased to give a coated wire diameter of 0.89 mm only one fault was detected in 30 meters of coated wire.

EXAMPLES 5 – 8

A further series of experiments was carried out at 75°C using the procedure described in the previous examples. Variations were made in the quantity of ammonium persulphate (APS), the quantity of disuccinic acid peroxide (DSAP) and the timing of the addition of the disuccinic acid peroxide. The total number of pressure drops in all cases was 55. These variations are summarised in the table below:

| EXAMPLE | QUANTITY OF APS (g) | QUANTITY OF DSAP (g) | DSAP ADDED AFTER X PRESSURE DROPS | ESTIMATED SOLIDS CONTENT (1) AND MONOMER CONVERSION (2) WHEN DSAP ADDED (%) | |
|---|---|---|---|---|---|
| | | | | (1) | (2) |
| 5 | 0.12 | 1.2 | X = 12 | 12 | 22 |
| 6 | 0.12 | 1.2 | X = 25 | 21 | 47 |
| 7 | 0.06 | 1.8 | X = 25 | 21 | 50 |
| 8 | 0.06 | 1.8 | X = 38 | 30 | 76 |

The properties of the resultant products are tabulated below. The value quoted for the extrusion performance is the number of faults detected per 30 meter length of coated wire with a diameter of 0.94 mm.

| EXAMPLE | SOLIDS CONTENT (%) | HFP CONTENT (%) | SSG | EXTRUSION PRESSURE MN/m² | EXTRUSION PERFORMANCE |
|---|---|---|---|---|---|
| 5 | 38.8 | 0.12 | 2.193 | 68 | 1 |
| 6 | 36.0 | 0.12 | 2.196 | 68 | 1 |
| 7 | 34.6 | 0.12 | 2.199 | 66 | 3 |
| 8 | 35.4 | 0.12 | 2.183 | 75 | 1 |

EXAMPLES 9 – 11

In a further series of examples carried out according to the procedure of Example 2 the timing of the addition of the DSAP was further varied as indicated in the table below.

| EXAMPLE | DSAP ADDED AFTER X PRESSURE DROPS | ESTIMATED SOLIDS CONTENT (1) AND MONOMER CONVERSION (2) WHEN DSAP ADDED (%) | | FINAL SOLIDS CONTENT |
|---|---|---|---|---|
| | | (1) | (2) | |
| 9 | X = 42 | 32.0 | 81 | 36.8 |
| 10 | X = 48 | 34.0 | 86 | 37.4 |
| 11 | X = 52 | 37.7 | 92 | 39.6 |

The properties of the resultant products are tabulated below. The value quoted for the extrusion performance is the number of faults detected per 30 meter length of coated wire having a diameter of 0.94 mm.

| EXAMPLE | HFP CONTENT (%) | SSG | EXTRUSION PRESSURE ($MN/m^2$) | EXTRUSION PERFORMANCE |
|---|---|---|---|---|
| 9 | 0.11 | 2.194 | 69.0 | 14 |
| 10 | 0.12 | 2.176 | 73.8 | >100 |
| 11 | 0.12 | 2.172 | 60.7 | >100 |

Examples 10 and 11 indicate that satisfactory products are not obtained if less than 15% of the total polymer is polymerised after the addition of the disuccinic acid peroxide.

EXAMPLES 12 AND 13

The procedure of Example 4 was repeated except in that the disuccinic acid concentration (as a weight percentage based on the weight of the aqueous polymerisation medium) was varied as indicated below.

| EXAMPLE | DSAP CONCENTRATION | ESTIMATED SOLIDS CONTENT (1) AND MONOMER CONVERSION (2) WHEN DSAP ADDED (%) | | FINAL SOLIDS CONTENT |
|---|---|---|---|---|
| | | (1) | (2) | |
| 12 | 0.01 | 30 | 82 | 34.4 |
| 13 | 0.06 | 30 | 76 | 36.0 |

In both these examples polymer was obtained which had an excellent extrusion performance as assessed by the test hereinbefore described.

EXAMPLES 14 to 16

In a further series of polymerisations the procedure of Example 4 was repeated except in that the ammonium persulphate and disuccinic acid concentrations were varied as indicated in the table below.

| EXAMPLE | APS CONCENTRATION (%) | DSAP CONCENTRATION (%) | SSG | HFP CONTENT |
|---|---|---|---|---|
| 14 | 0.005 | 0.005 | 2.177 | 0.14 |
| 15 | 0.005 | 0.01 | 2.180 | 0.15 |
| 16 | 0.005 | 0.03 | 2.179 | 0.14 |

The injection of DSAP was made at monomer conversions of 73%, 72% and 73% respectively for the three examples. In all cases polymers were obtained which gave an excellent performance in the extrusion performance test hereinbefore defined.

The following is an example of the use of the process of the invention in preparing a tetrafluoroethylene homopolymer.

EXAMPLE 17

A 10 liter, stirred, horizontal autoclave was charged with 5900 ml of distilled water, 60 g of paraffin wax and 9 g of ammonium perfluoro octanoate. The autoclave was heated to 70°C and then evacuated for 5 minutes to remove oxygen dissolved in the water. A vacuum of about 50 cm of mercury was obtained. The autoclave was then pressurised to 2.1 $MN/m^2$ (300 psig) with tetrafluoroethylene. A solution of ammonium persulphate (0.06 g in 100 ml water) was injected into the autoclave. Polymerisation took place and the pressure in the autoclave fell. After the pressure had fallen to a value of 1.8 $MN/m^2$ (260 psig) the autoclave was repressurised to 2.1 $MN/m^2$ (300 psig). After 38 pressure drops (equivalent to an estimated solids content of 30% by weight or a monomer conversion of 78%) 1.8 g of disuccinic acid peroxide dissolved in 100 g of distilled water was injected giving a DSAP concentration in the aqueous polymerisation medium of 0.03% by weight. The repressurisation procedure was then resumed and following the final pressure drop after a total of 60 repressurisations, the gas phase in the autoclave was vented. A polytetrafluoroethylene dispersion with a solids content of 35.3% was obtained. The dried fine powder produced from the dispersion in a similar way to that described in Example 1 had an SSG of 2.189. The extrusion pressure of the powder determined by the method previously described was 82.7 MN/m$^2$ (12000 psi).

We claim:

1. A process for the production of polymers of tetrafluoroethylene suitable for extrusion at a high reduction ratio comprising polymerising tetrafluoroethylene in an aqueous medium in the presence of a free radical catalyst system and a dispersing agent to produce an aqueous dispersion of the tetrafluoroethylene polymer, the polymerisation being one of the following: homopolymerisation, polymerisation in the presence of a chain transfer agent and copolymerisation with a minor amount of one or more comonomers wherein the polymerisation is initiated by the use of a catalyst selected from water soluble persulphates and hydrogen peroxide and after at least 20% by weight but before 85% by weight of the total polymer to be formed has been polymerised, a dibasic carboxylic acid peroxide is added in an amount sufficient to ensure that the polymer of tetrafluoroethylene produced exhibits improved electrical insulation performance when extruded into shaped articles as compared with tetrafluoroethylene polymers produced by using only a free radical catalyst selected from hydrogen peroxide and salts of water soluble persulphates and compared with tetrafluoroethylene polymers produced when a dibasic carboxylic acid is added before 20% or after 85% by weight of the total polymer to be formed has been polymerised.

2. A process according to claim 1 wherein the dibasic carboxylic acid peroxide is disuccinic acid peroxide.

3. A process according to claim 2 wherein the disuccinic acid peroxide is added at a stage when from 50% to 75% by weight of the total polymer to be formed has been polymerised.

4. A process according to claim 2 wherein the amount of disuccinic acid peroxide added is sufficient to provide a concentration of from 0.01% to 0.06% by weight based on the weight of the aqueous medium.

5. A process according to claim 1 wherein tetrafluoroethylene is copolymerised with hexafluoropropene.

6. A process for the production of polymers of tetrafluoroethylene suitable for extrusion at a high reduction ratio comprising polymerising tetrafluoroethylene in an aqueous medium in the presence of a free radical catalyst system and a dispersing agent to produce an aqueous dispersion of the tetrafluoroethylene polymer, the polymerisation being one of the following: homopolymerisation, polymerisation in the presence of a chain transfer agent and copolymerisation with a minor amount of one or more comonomers wherein the polymerisation is initiated by the use of a catalyst selected from water soluble persulphates and hydrogen peroxide and after at least 20% by weight but before 85% by weight of the total polymer to be formed has been polymerised, at least 0.005% based on the weight of the aqueous medium of disuccinic acid peroxide is added.

* * * * *